United States Patent
Hirayama (10) Patent No.: US 9,451,104 B2
(45) Date of Patent: Sep. 20, 2016

(54) IMAGE FORMING APPARATUS (71) Applicant: KYOCERA Document Solutions Inc., Osaka-shi, Osaka (JP)

(72) Inventor: Hayato Hirayama, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/223,310

(22) Filed: Mar. 24, 2014

(65) Prior Publication Data
US 2014/0293337 A1 Oct. 2, 2014

(30) Foreign Application Priority Data
Mar. 28, 2013 (JP) .................... 2013-070520

(51) Int. Cl.
G06F 15/00 (2006.01)
H04N 1/00 (2006.01)
G06K 15/16 (2006.01)
G06K 15/00 (2006.01)

(52) U.S. Cl.
CPC ........... H04N 1/0032 (2013.01); G06K 15/16 (2013.01); G06K 15/4025 (2013.01); H04N 1/00623 (2013.01); H04N 1/00649 (2013.01)

(58) Field of Classification Search
CPC .............................. G06K 15/16; H04N 1/0032
USPC ....................................................... 358/1.15
See application file for complete search history.

(56) References Cited

U.S. PATENT DOCUMENTS

2002/0015184 A1 2/2002 Hatakeyama
2003/0048474 A1* 3/2003 Hong et al. .................. 358/1.15
2013/0256980 A1* 10/2013 Mizuno .................... B65H 1/00
271/162

FOREIGN PATENT DOCUMENTS

JP 2001184177 A 7/2001
JP 2003094766 A 4/2003

OTHER PUBLICATIONS

Machine translation of Japanese Patent Document No. 2009-120373, Akihito et al., Jun. 4, 2009.*

* cited by examiner

Primary Examiner — Mark Milia
(74) Attorney, Agent, or Firm — Alleman Hall McCoy Russell & Tuttle LLP (57) ABSTRACT An image forming apparatus includes an apparatus main body and a plurality of stages of option devices. An output connector of the apparatus main body is connected to an input connector of the option device in a foremost stage. An output connector of the option device in each stage other than an aftermost stage is connected to an input connector of the option device in a subsequent stage. An output connector of the option device in the aftermost stage is connected to ground. A main body control portion outputs a predetermined signal via the output connector of the apparatus main body when initial communication is performed. Each option control portion identifies in which stage of the option device the self-device is, on the basis of a voltage value of the predetermined signal inputted to an analog input port via the input connector.

1 Claim, 6 Drawing Sheets

| | VOLTAGE VALUE (V) |
|---|---|
| FIRST STAGE | 3.30 |
| SECOND STAGE | 1.65 |
| THIRD STAGE | 0.83 |
| FOURTH STAGE | 0.41 |

FIG. 6

IMAGE FORMING APPARATUS

INCORPORATION BY REFERENCE

This application is based upon and claims the benefit of priority from the corresponding Japanese Patent Application No. 2013-070520 filed on Mar. 28, 2013, the entire contents of which are incorporated herein by reference.

BACKGROUND

The present disclosure relates to an image forming apparatus.

Conventionally, among image forming apparatuses such as printers, copy machines, and multifunction peripherals, there is a model on which a plurality of option devices (e.g., auxiliary sheet feed devices, etc.) for extending or adding functions are mountable. An apparatus main body of such an image forming apparatus includes a main body control portion which controls an image forming operation. Meanwhile, each option device includes an option control portion which is connected to the main body control portion in a communicable manner and controls an operation of the option device that is the self-device, on the basis of a control signal inputted from the main body control portion. For example, in the case where a plurality of auxiliary sheet feed devices are mounted as option devices on the apparatus main body, when initial communication is performed immediately after start of power supply, the main body control portion of the apparatus main body outputs a signal for causing each auxiliary sheet feed device to identify its mounted position (mounted stage number), via a selection signal line. Meanwhile, the option control portion of each auxiliary sheet feed device identifies the mounted position of the auxiliary sheet feed device that is the self-device, on the basis of the signal inputted from the apparatus main body.

For example, as conventional art, a printer is known which includes four stages of option trays (auxiliary sheet feed devices) and causes each option tray to identify its mounted position (mounted stage number) by using a left-rotate and carry mode. In the printer, a position designation signal output portion (corresponding to the above main body control portion) outputs, for example, a 2-bit position designation signal to the option tray in the uppermost stage. Upon reception of the position designation signal, an option position determination portion (corresponding to the above option control portion) of the option tray in the uppermost stage collates information regarding the mounted position of the option tray which is stored in an option position storage portion and corresponds to the value of the 2 bits, with the value of the 2 bits of the received position designation signal, and identifies the mounted position of the option tray that is the self-device. Furthermore, the option position determination portion inverts the high-order bit of the 2 bits of the position designation signal, interchanges the high-order bit with the low-order bit, and outputs the resultant signal to the option trays in the lower stages.

SUMMARY

An image forming apparatus according to one aspect of the present disclosure includes: an apparatus main body configured to form an image on a recording sheet; and a plurality of stages of option devices mounted on the apparatus main body. The apparatus main body includes: a main body control portion configured to control an image forming operation; and an output connector connected to the main body control portion via one signal line. Each option device includes: an option control portion configured to control an operation of the self-device and including an analog input port; a first resistor connected at one end thereof to the analog input port; a second resistor connected at one end thereof to the analog input port and the one end of the first resistor and connected at another end thereof to ground; an input connector connected to the analog input port and a connection point of the one end of the first resistor and the one end of the second resistor; and an output connector connected to another end of the first resistor. The output connector of the apparatus main body is connected to the input connector of the option device in a foremost stage. The output connector of the option device in each stage other than an aftermost stage is connected to the input connector of the option device in a subsequent stage. The output connector of the option device in the aftermost stage is connected to the ground. The main body control portion outputs a predetermined signal via the output connector of the apparatus main body when initial communication is performed. Each option control portion identifies in which stage of the option device the self-device is, on the basis of a voltage value of the predetermined signal inputted to the analog input port via the input connector.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the drawings.

A printer A according to the present embodiment is an image forming apparatus which forms an image on a recording sheet on the basis of an electrophotographic method. The printer A includes: an apparatus main body 10 which forms an image on a recording sheet; and auxiliary sheet feed devices 20A, 20B, 20C, and 20D which are option devices mounted below the apparatus main body 10 so as to be stacked in four stages. It should be noted that in the following description, 20 is used as the reference sign for the auxiliary sheet feed devices in the case where it is unnecessary to individually use 20A, 20B, 20C, and 20D as the reference signs for the respective auxiliary sheet feed device.

Figure 1:
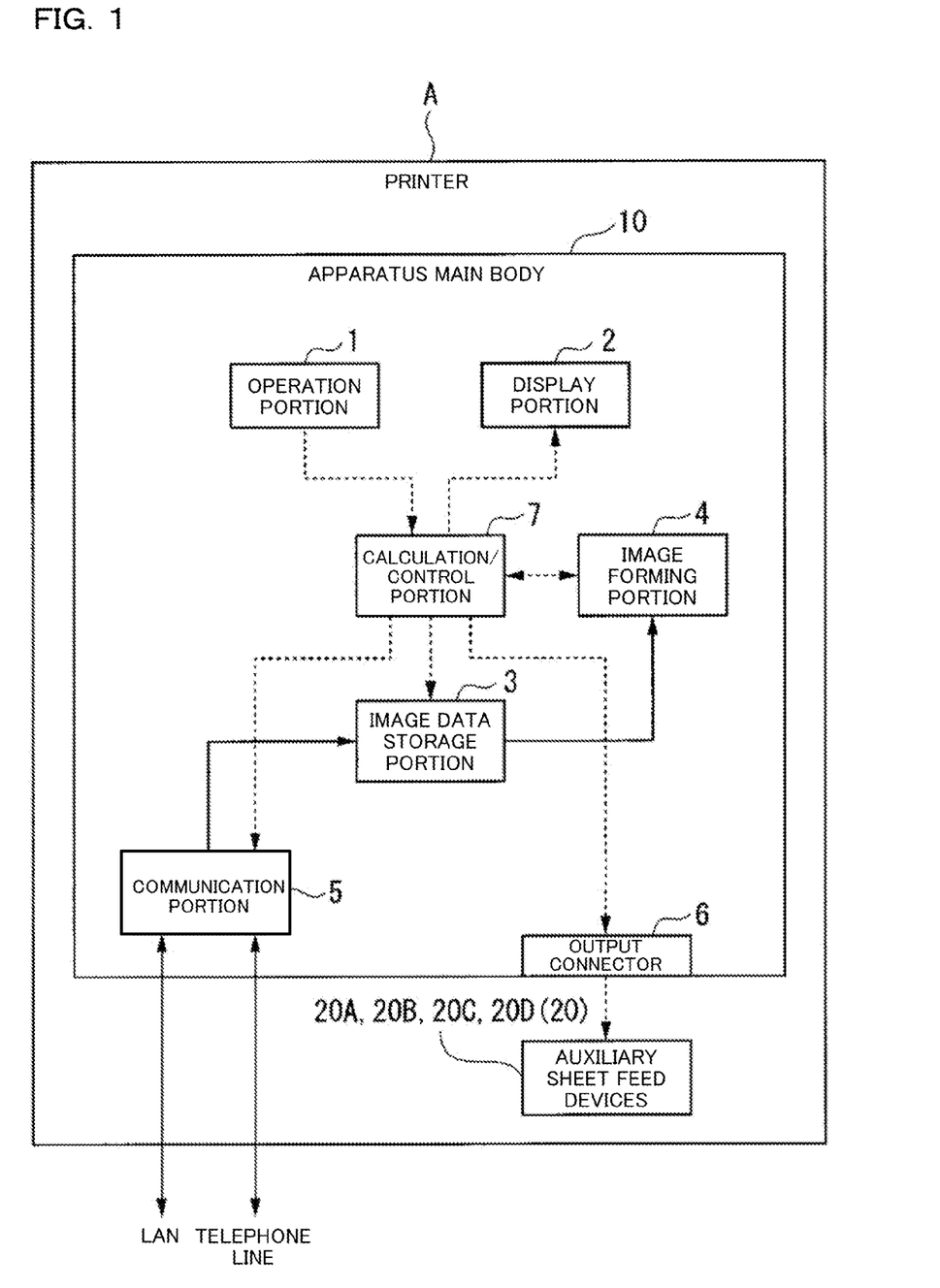
FIG. 1 is a functional block diagram of a printer according to an embodiment of the present disclosure.

As shown in FIG. 1, the apparatus main body 10 includes an operation portion 1, a display portion 2, an image data storage portion 3, an image forming portion 4, a communication portion 5, an output connector 6, and a calculation/control portion 7 (a main body control portion). It should be noted that in FIG. 1, each solid line arrow indicates flow of data, and each dotted line arrow indicates flow of a control signal or a detection signal.

The operation portion 1 is physically provided as hardware keys. For example, the operation portion 1 includes a menu key, an online key, a power key, a reset key, up, down, right, and left keys, and other various operation keys. In the operation portion 1, when each key described above is pressed by a user, an operation signal is outputted from each key to the calculation/control portion 7.

The display portion 2 is, for example, a liquid crystal monitor, and displays various screens including images and characters, on the basis of signals inputted from the calculation/control portion 7.

The image data storage portion 3 is a semiconductor memory, a hard disk device, or the like. The image data storage portion 3 stores print image data which is received by the communication portion 5 from an external client computer on the basis of a control signal inputted from the calculation/control portion 7, and facsimile image data or print image data which is received by the communication portion 5 from an external facsimile apparatus or the like on the basis of a control signal inputted from the calculation/control portion 7. In addition, the image data storage portion 3 reads these image data and outputs these image data to the image forming portion 4 on the basis of a control signal inputted from the calculation/control portion 7.

Figure 2:
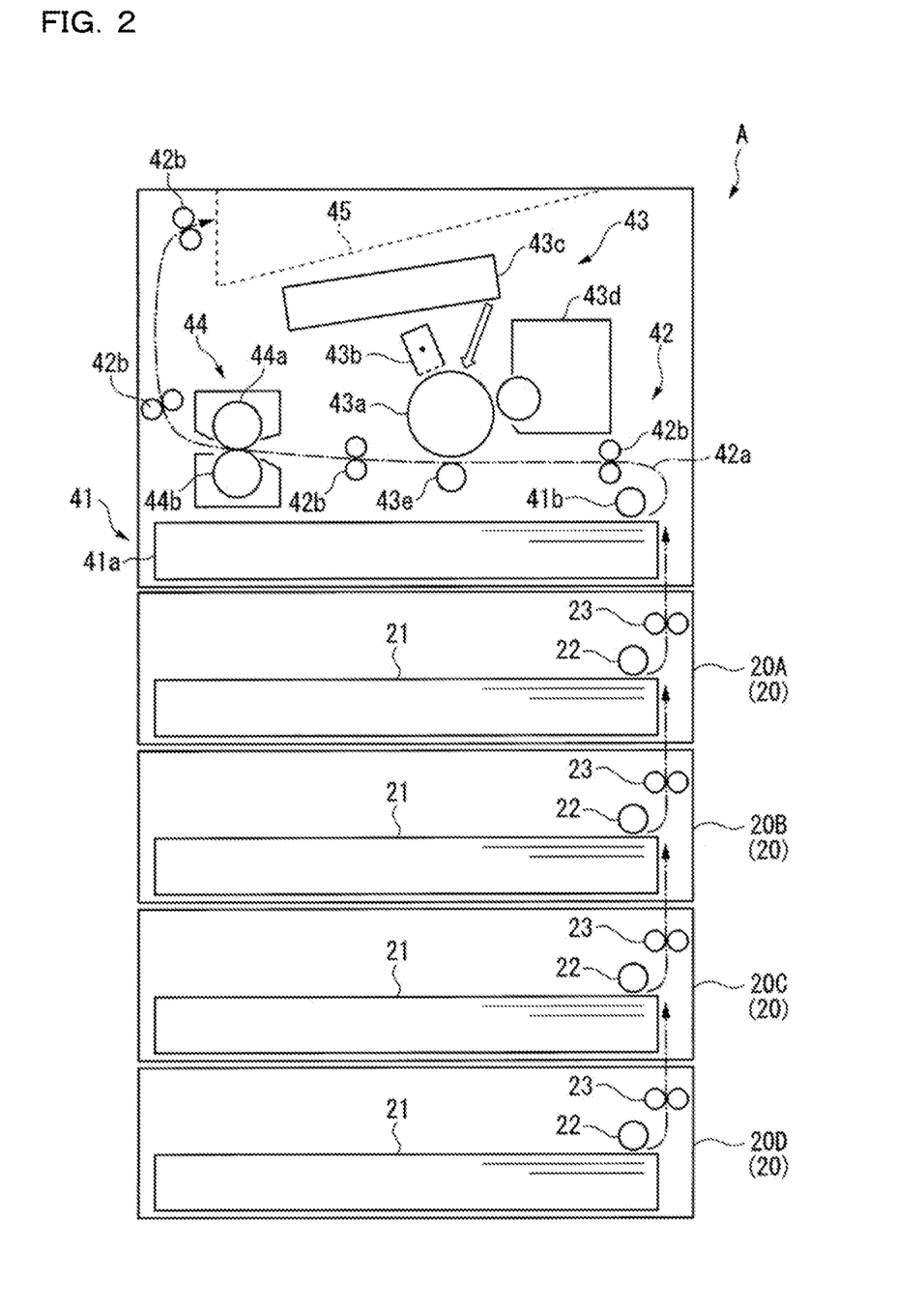
FIG. 2 is a schematic diagram showing the mechanical configurations of an image forming portion and auxiliary sheet feed devices according to the embodiment of the present disclosure.

The image forming portion 4 forms a toner image which is based on the image data read from the image data storage portion 3, on a recording sheet on the basis of a control signal inputted from the calculation/control portion 7. As shown in FIG. 2, the image forming portion 4 includes a sheet feed portion 41, a paper sheet conveying portion 42, an image forming unit 43, a fixing portion 44, and a sheet discharge tray 45.

The sheet feed portion 41 feeds a recording sheet toward the image forming unit 43. The sheet feed portion 41 includes: a sheet feed cassette 41a which stores recording sheets having a predetermined size; and a pick-up roller 41b which picks up the recording sheets one by one from the sheet feed cassette 41a and feeds the recording sheets to a later-described paper sheet conveyance path 42a. It should be noted that the sheet feed cassette 41a is capable of being inserted/pulled out through the front surface of the printer A by a slide mechanism including a guide rail or the like.

The paper sheet conveying portion 42 conveys the recording sheets fed from the sheet feed portion 41, via the image forming unit 43 and the fixing portion 44 finally to the sheet discharge tray 45. The paper sheet conveying portion 42 includes: the paper sheet conveyance path 42a formed by a guide member and the like; and conveying rollers 42b provided at a plurality of locations along the paper sheet conveyance path 42a. It should be noted that as described later, recording sheets fed from the respective auxiliary sheet feed devices 20A, 20B, 20C, and 20D which are the option devices also enter into the paper sheet conveyance path 42a.

The image forming unit 43 forms a toner image corresponding to an image to be printed, on a recording sheet conveyed via the paper sheet conveyance path 42a from the sheet feed portion 41 (or any of the auxiliary sheet feed devices 20A, 20B, 20C, and 20D). The image forming unit 43 includes a photosensitive drum 43a, a charging unit 43b, an exposure unit 43c, a developing unit 43d, and a transfer roller 43e.

The photosensitive drum 43a is a cylindrical photoreceptor on which an electrostatic latent image corresponding to an image to be printed is formed and which carries a developed toner image. The charging unit 43b uniformly charges the surface of the photosensitive drum 43a at a predetermined potential. The exposure unit 43c irradiates the charged surface of the photosensitive drum 43a with laser light to form an electrostatic latent image thereon.

The developing unit 43d stores therein a predetermined amount of toner (toner having positive polarity), and supplies the toner to a photosensitive surface, thereby developing, as a toner image, an electrostatic latent image formed on the photosensitive surface. A transfer bias (high voltage) having negative polarity is applied to the transfer roller 43e, and the toner image formed on the photosensitive drum 43a is transferred onto a recording sheet by the action of the transfer bias.

The fixing portion 44 includes: a heating roller 44a including a heater therein; and a pressure roller 44b pressed against the heating roller 44a. The fixing portion 44 heats and pressurizes a recording sheet on which a toner image has been transferred, by sandwiching the recording sheet between the heating roller 44a and the pressure roller 44b, thereby fixing the toner image on the recording sheet. A contact surface (surface) of each of the heating roller 44a and the pressure roller 44b which contact surface contacts with a recording sheet is formed from a fluorine-based material which is charged with negative polarity by friction. In other words, the surface of each of the heating roller 44a and the pressure roller 44b is charged with negative polarity by friction with a recording sheet R.

The sheet discharge tray 45 is a storage portion which stores and holds recording sheets conveyed from the fixing portion 44 via the paper sheet conveyance path 42a.

The communication portion 5 communicates with an external printer or facsimile apparatus via a telephone line or with a client computer or the like via a LAN (Local Area Network) on the basis of a control signal inputted from the calculation/control portion 7. In other words, the communication portion 5 has: a communication function that conforms to a LAN standard such as Ethernet (registered trademark); and a communication function that conforms to a facsimile standard such as G3.

The output connector 6 is connected to a main body CPU 73 of the later-described calculation/control portion 7 via a plurality of communication lines (not shown) including one selection signal line SEL (see FIG. 3). When the auxiliary sheet feed devices 20A, 20B, 20C, and 20D are mounted on the apparatus main body 10, as shown in FIG. 3, the output connector 6 is connected to an input connector 27 of the auxiliary sheet feed device 20A mounted in the uppermost stage (the first stage).

Figure 3:
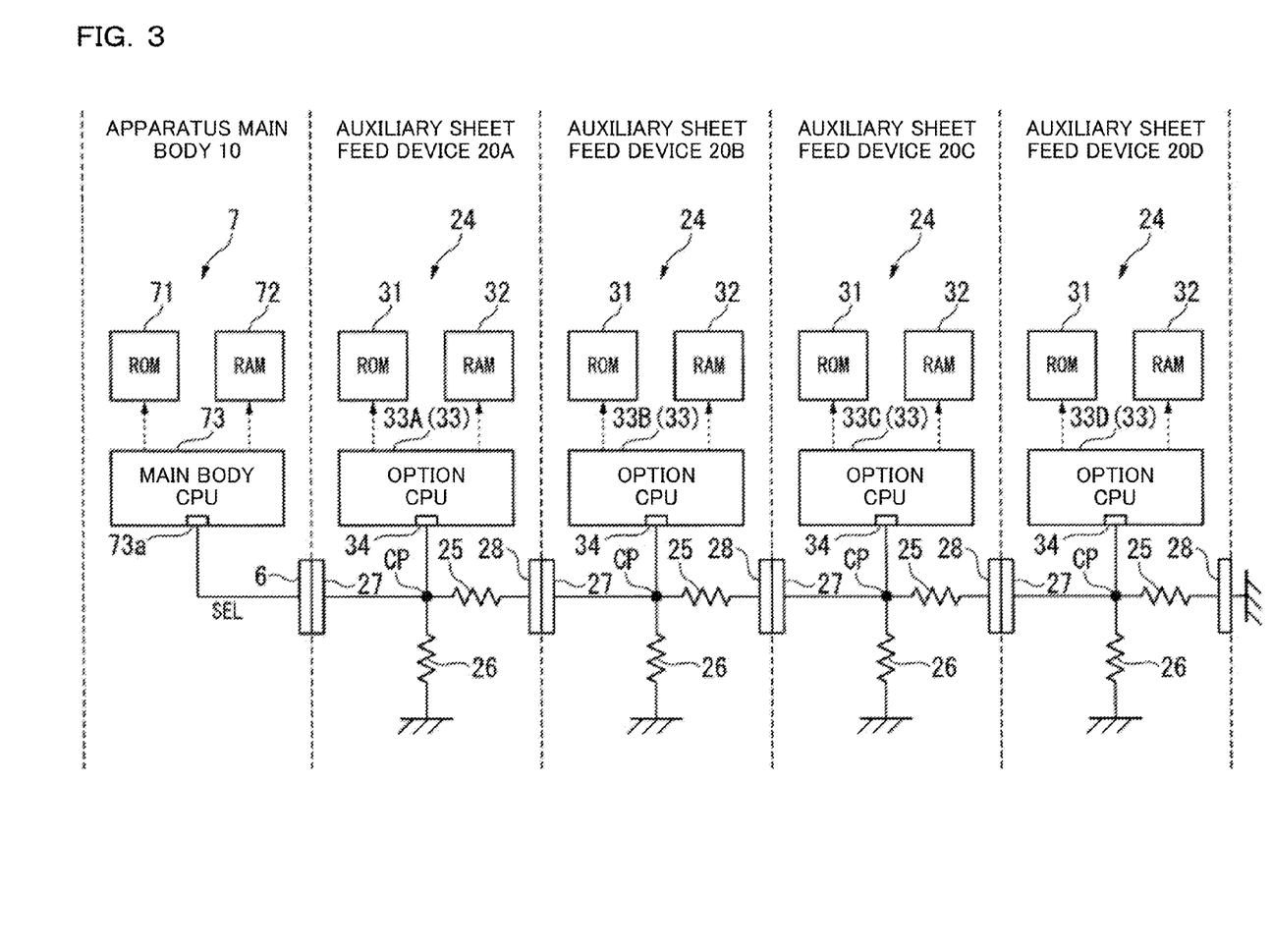
FIG. 3 is a diagram showing a connection state of a main body CPU (Central Processing Unit) and option CPUs according to the embodiment of the present disclosure.

As shown in FIG. 3, the calculation/control portion 7 includes a ROM (Read Only Memory) 71, a RAM (Random Access Memory) 72, and the main body CPU (Central Processing Unit) 73. The calculation/control portion 7 controls the overall operation of the printer A by communicating with each portion on the basis of a control program stored in the ROM 71.

The ROM 71 is a non-volatile memory which stores the control program executed by the main body CPU 73 and other data.

The RAM 72 is a volatile memory which is used as a working area in which data is temporarily stored when the main body CPU 73 executes the control program to perform various operations.

The main body CPU 73 controls the overall operation of the printer A on the basis of the control program stored in the ROM 71 and in accordance with an operation instruction received by the operation portion 1 and various instructions received by the communication portion 5 from an external client computer or the like. In addition, the main body CPU 73 includes a digital output port 73a (hereinafter, referred to as output port 73a) for outputting a selection signal which is a digital signal for selecting the auxiliary sheet feed device 20 that is to be a communication partner. The output port 73a is connected to the output connector 6 via the one selection signal line SEL.

In addition, the main body CPU 73 includes a port, which is not shown, in addition to the digital output port 73a, and this port is connected to the output connector 6 via a communication line other than the selection signal line SEL. Although described in detail later, as part of various control processing, the main body CPU 73 outputs a selection signal for causing each of the auxiliary sheet feed devices 20A, 20B, 20C, and 20D to identify its mounted position (mounted stage number), from the output port 73a when initial communication is performed immediately after start of power supply.

The auxiliary sheet feed devices 20A, 20B, 20C, and 20D are option devices which feed recording sheets having sizes different from each other, respectively, to the image forming portion 4. As shown in FIG. 2, each of the auxiliary sheet feed devices 20A, 20B, 20C, and 20D includes: a sheet feed cassette 21 which stores recording sheets having a predetermined size; a pick-up roller 22 which picks up the recording sheets one by one from the sheet feed cassette 21; and feed rollers 23 which convey the picked-up recording sheets to the paper sheet conveyance path 42a of the image forming portion 4.

It should be noted that when a recording sheet is fed from the auxiliary sheet feed device 20 at the lower-stage side to the image forming portion 4, the recording sheet is conveyed via the auxiliary sheet feed devices 20 at the upper-stage side to the image forming portion 4. For example, a recording sheet fed from the auxiliary sheet feed device 20C is conveyed via the auxiliary sheet feed device 20B and the auxiliary sheet feed device 20A at the upper-stage side finally to the image forming portion 4. In the present embodiment, the case is described where the four auxiliary sheet feed devices 20A, 20B, 20C, and 20D are mounted on the image forming portion 4, but the number of the auxiliary sheet feed devices is not limited to four.

In addition, as shown in FIG. 3, each of the auxiliary sheet feed devices 20A, 20B, 20C, and 20D includes an option calculation/control portion 24 (an option control portion) which is connected to the later-described calculation/control portion 7 in a communicable manner and controls an operation of the self-device in accordance with a control signal from the calculation/control portion 7. Moreover, each of the auxiliary sheet feed devices 20A, 20B, 20C, and 20D includes a first resistor 25, a second resistor 26, an input connector 27, and an output connector 28.

As shown in FIG. 3, each option calculation/control portion 24 includes a ROM 31, a RAM 32, and an option CPU 33. It should be noted that in FIGS. 3, 33A, 33B, 33C, and 33D are used as the reference signs for the option CPUs 33 of the auxiliary sheet feed devices 20A, 20B, 20C, and 20D, respectively. In addition, in the following description, 33 is used as the reference sign for the option CPUs in the case where it is unnecessary to individually use 33A, 33B, 33C, and 33D as the reference signs for the respective option CPUs.

The ROM 31 is a non-volatile memory which stores a control program executed by the option CPU 33 and other data.

The RAM 32 is a volatile memory which is used as a working area in which data is temporarily stored when the option CPU 33 executes the control program to perform various operations.

The option CPU 33 controls the overall operation of the auxiliary sheet feed device 20 which is the self-device, on the basis of the control program stored in the ROM 31 and in accordance with a control signal from the calculation/control portion 7. In addition, the option CPU 33 includes an analog input port 34 (hereinafter, referred to as input port 34) for receiving a signal. The input port 34 is connected to one end of the first resistor 25, one end of the second resistor 26, and the input connector 27 by the selection signal line SEL. In other words, the input port 34 of the option CPU 33 is connected to the one end of the first resistor 25, the one end of the second resistor 26, and the input connector 27 via a connection point CP. Although described in detail later, as part of various control processing, the option CPU 33 identifies the mounted position (mounted stage number) of the auxiliary sheet feed device 20 which is the self-device, on the basis of a selection signal inputted from the main body CPU 73.

The main body CPU 73 and the option CPU 33 are connected in a communicable manner to each other via the one selection signal line SEL which is used for the main body CPU 73 to select the option CPU 33 that is to be a communication partner. In other words, in order to electrically connect the main body CPU 73 to the option CPUs 33A, 33B, 33C, and 33D, the selection signal line SEL is connected to the output connector 6 of the apparatus main body 10 and the input connectors 27 and the output connectors 28 of the auxiliary sheet feed devices 20A, 20B, 20C, and 20D.

Furthermore, the main body CPU 73 and each option CPU 33 are connected to each other by, as a communication line other than the selection signal line SEL, for example, a ready signal line (communication preparation signal line) in order for the option CPU 33 to notify the main body CPU 73 that the option CPU 33 is in a communication enabled state, a reception data signal line in order for the main body CPU 73 to receive data from the option CPU 33, a transmission data signal line in order for the main body CPU 73 to transmit data to the option CPU 33, or a clock signal line in order for the main body CPU 73 and the option CPU 33 to share a clock signal to synchronize with each other.

For example, when the option CPU 33A determines that the option CPU 33A has been selected as a communication partner by the main body CPU 73, on the basis of a selection signal received from the main body CPU 73 via the selection signal line SEL, and comes into a state where communication with the main body CPU 73 is enabled, the option CPU 33A changes the potential of the ready signal line from a low level to a high level to notify the main body CPU 73 that the option CPU 33A is in the communication enabled state. When the main body CPU 73 detects the change in the potential of the ready signal line, the main body CPU 73 recognizes that the option CPU 33A which has been selected as a communication partner is in the communication enabled state, and starts communication therewith. It should be noted that the same applies to the option CPUs 33B, 33C, and 33D.

Subsequently, when the main body CPU 73 detects the change in the potential of the ready signal line and recognizes that the option CPU 33A which has been selected as a communication partner is in the communication enabled state, the main body CPU 73 transmits data via the transmission data signal line in synchronization with rising of the clock signal flowing through the clock signal line. Meanwhile, the option CPU 33A retains data in the transmission data signal line in synchronization with falling of the clock signal flowing through the clock signal line.

On the other hand, in the case of transmitting data to the main body CPU 73, the option CPU 33A transmits the data to the main body CPU 73 via the reception data signal line in synchronization with rising of the clock signal. Meanwhile, the main body CPU 73 retains data in the reception data signal line in synchronization with falling of the clock signal. It should be noted that the same applies to the option CPUs 33B, 33C, and 33D.

The first resistor 25 has a predetermined electric resistance value and is connected at the one end thereof to the input port 34 of the option CPU 33, the one end of the second resistor 26, and the input connector 27 by the selection signal line SEL. In other words, the first resistor 25 is connected at the one end thereof to the input port 34 of the option CPU 33, the one end of the second resistor 26, and the input connector 27 via the connection point CP. Meanwhile, the other end of the first resistor 25 is connected to the output connector 28 by the selection signal line SEL.

The second resistor 26 has a predetermined electric resistance value and is connected at the one end thereof to the input port 34 of the option CPU 33, the one end of the first resistor 25, and the input connector 27 by the selection signal line SEL. In other words, the second resistor 26 is connected at the one end thereof to the input port 34 of the option CPU 33, the one end of the first resistor 25, and the input connector 27 via the connection point CP. Meanwhile, the other end of the second resistor 26 is connected to ground. It should be noted that the electric resistance values of the first resistor 25 and the second resistor 26 may be the same or different from each other, but are the same in the present embodiment.

The input connector 27 is connected to the input port 34 of the option CPU 33, the one end of the first resistor 25, and the one end of the second resistor 26 by the selection signal line SEL. When the auxiliary sheet feed device 20 which is the self-device is mounted on the apparatus main body 10, the input connector 27 comes into a state of being connected to the output connector 6 of the apparatus main body 10 or the output connector 28 of the auxiliary sheet feed device 20 in the previous stage. In other words, when the auxiliary sheet feed device 20 which is the self-device is mounted in the uppermost stage (the first stage), the input connector 27 is connected to the output connector 6 of the apparatus main body 10; and when the auxiliary sheet feed device 20 which is the self-device is mounted in a stage other than the uppermost stage (any of the second to fourth stages), the input connector 27 is connected to the output connector 28 of the auxiliary sheet feed device 20 in the immediately upper stage.

The output connector 28 is connected to the other end of the first resistor 25 by the selection signal line SEL. When the auxiliary sheet feed device 20 which is the self-device is mounted on the apparatus main body 10, the output connector 28 comes into a state of being connected to the input connector 27 of the auxiliary sheet feed device 20 in the subsequent stage or the ground. In other words, when the auxiliary sheet feed device 20 which is the self-device is mounted in a stage other than the lowermost stage (any of the first to third stages), the output connector 28 is connected to the input connector 27 of the auxiliary sheet feed device 20 in the immediately lower stage; and when the auxiliary sheet feed device 20 which is the self-device is mounted in the lowermost stage (fourth stage), the output connector 28 is connected to the ground.

Figure 4:
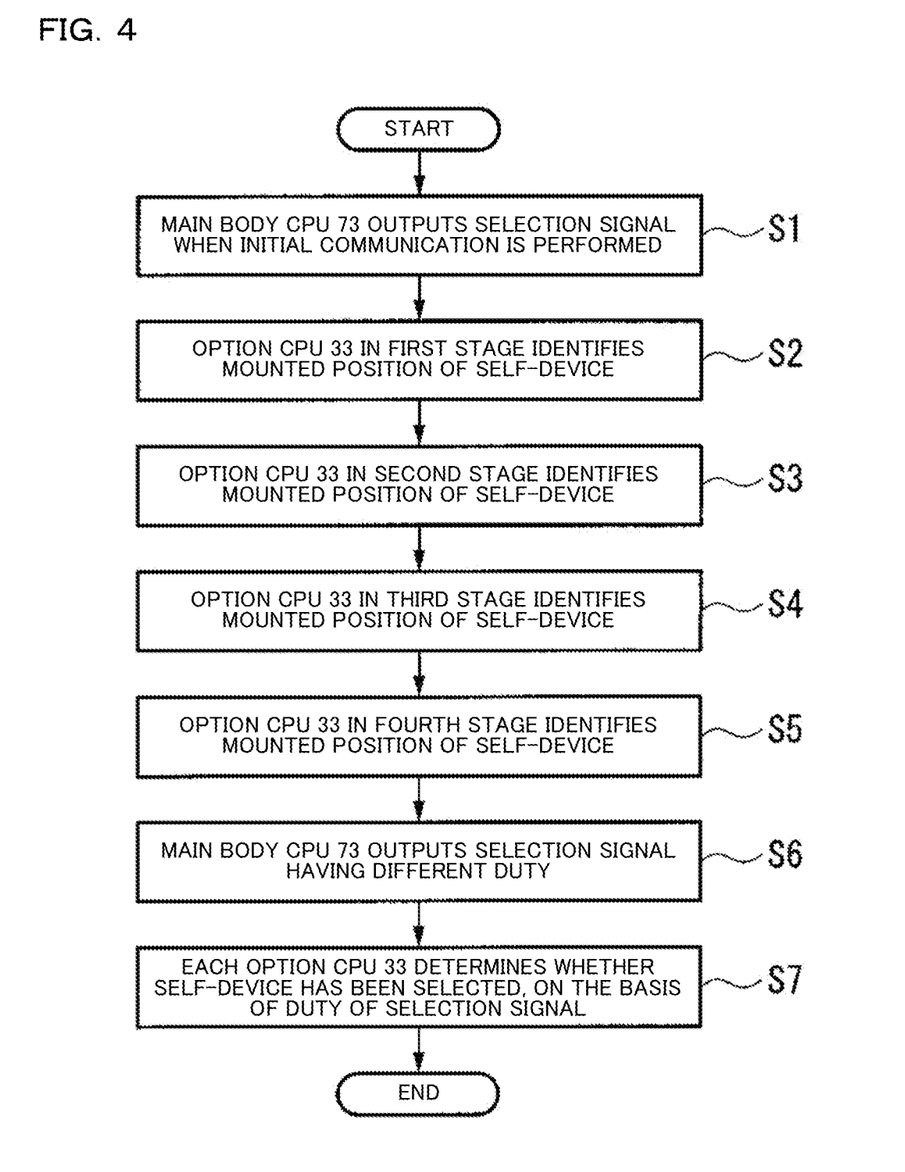
FIG. 4 is a flowchart showing an operation of the printer according to the embodiment of the present disclosure.
Figure 5:
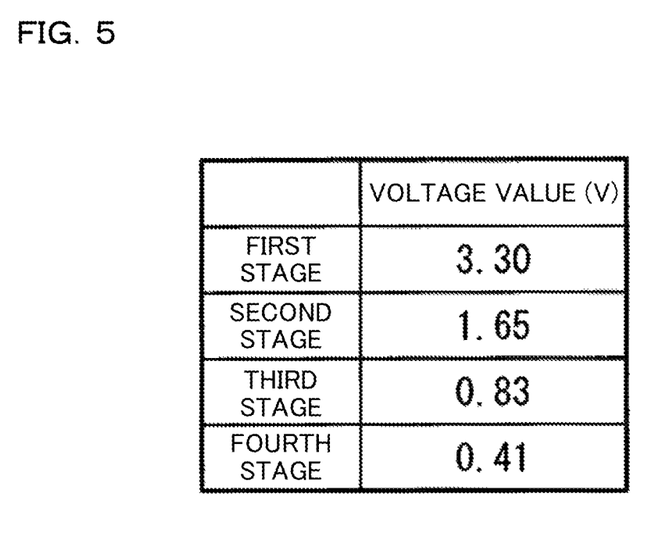
FIG. 5 is a diagram showing voltage values detected by the option CPUs in respective stages according to the embodiment of the present disclosure.
Figure 6:
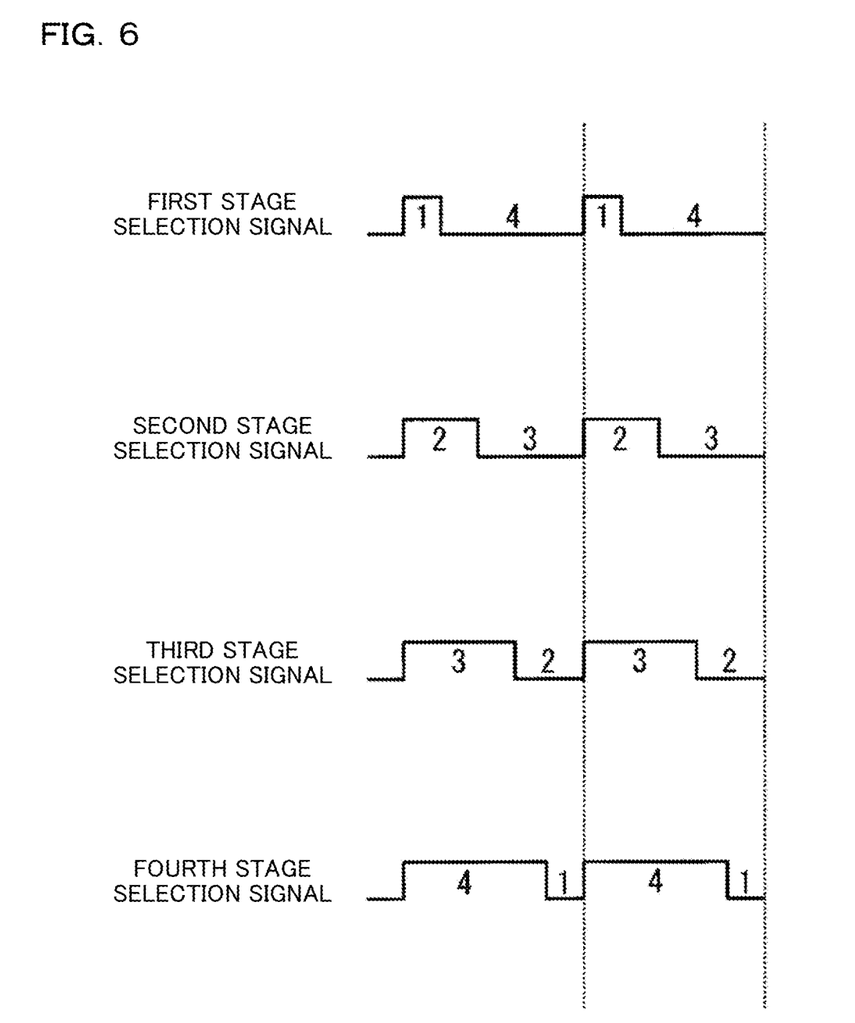
FIG. 6 is a diagram showing selection signals which have different duties and are outputted by the main body CPU according to the embodiment of the present disclosure.

Next, operations of the main body CPU 73 and the option CPUs 33 of the printer A configured thus will be described with reference to FIGS. 4 to 6.

When the power key of the operation portion 1 is pressed and power supply is started, the main body CPU 73 performs initial communication with each portion as processing performed immediately after start of power supply. For example, as the initial communication, the main body CPU 73 outputs a selection signal (predetermined signal) for causing each option CPU 33 to identify the mounted position (mounted stage number) of the auxiliary sheet feed device 20, from the output port 73a via the output connector 6 of the apparatus main body 10 (step S1).

When the selection signal is outputted from the output connector 6 of the apparatus main body 10, the selection signal is transmitted via the selection signal line SEL to the respective auxiliary sheet feed devices 20A, 20B, 20C, and 20D and inputted to the input ports 34 of the respective option CPUs 33A, 33B, 33C, and 33D of the auxiliary sheet feed devices 20A, 20B, 20C, and 20D.

When the selection signal is inputted to the input port 34 via the input connector 27 of the auxiliary sheet feed device 20A, the option CPU 33A in the uppermost stage (first stage) identifies in which stage the auxiliary sheet feed device 20A which is the self-device is mounted, on the voltage value of the selection signal (step S2). In other words, since the main body CPU 73 and the option CPU 33A are connected to each other by only the one selection signal line SEL, when the main body CPU 73 outputs a selection signal having a peak-to-peak of 3.3 V, the option CPU 33A detects the selection signal having a peak-to-peak of 3.3 V (see FIG. 5) and determines that the auxiliary sheet feed device 20A which is the self-device is in the first stage, on the basis of this voltage value.

In addition, when the selection signal is inputted to the input port 34 via the input connector 27 of the auxiliary sheet feed device 20B, the option CPU 33B in the second stage identifies in which stage the auxiliary sheet feed device 20B which is the self-device is mounted, on the basis of the voltage value of the selection signal (step S3). In other words, for example, when the main body CPU 73 outputs a selection signal having a peak-to-peak of 3.3 V, since 3.3 V is divided by the first resistor 25 of the auxiliary sheet feed device 20A and the second resistor 26 of the auxiliary sheet feed device 20B, the option CPU 33B detects 1.65 V which is about half of 3.3 V as the peak-to-peak of the selection signal (see FIG. 5). Then, the option CPU 33B determines that the auxiliary sheet feed device 20B which is the self-device is in the second stage, on the basis of this voltage value.

In addition, when the selection signal is inputted to the input port 34 via the input connector 27 of the auxiliary sheet feed device 20C, the option CPU 33C in the third stage identifies in which stage the auxiliary sheet feed device 20C which is the self-device is mounted, on the basis of the voltage value of the selection signal (step S4). In other words, in the option CPU 33C, for example, when the main body CPU 73 outputs a selection signal having a peak-to-peak of 3.3 V, 3.3 V is divided by the first resistor 25 of the auxiliary sheet feed device 20A and the second resistor 26 of the auxiliary sheet feed device 20B. Subsequently, the divided voltage value is divided by the first resistor 25 of the auxiliary sheet feed device 20B and the second resistor 26 of the auxiliary sheet feed device 20C. Thus, the option CPU 33C detects 0.83 V which is about a quarter of 3.3 V as the peak-to-peak of the selection signal (see FIG. 5). Then, the option CPU 33C determines that the auxiliary sheet feed device 20C which is the self-device is in the third stage, on the basis of this voltage value.

Moreover, when the selection signal is inputted to the input port 34 via the input connector 27 of the auxiliary sheet feed device 20D, the option CPU 33D in the fourth stage identifies in which stage the auxiliary sheet feed device 20D which is the self-device is mounted, on the basis of the voltage value of the selection signal (step S5). In other words, for example, when the main body CPU 73 outputs a selection signal having a peak-to-peak of 3.3 V, 3.3 V is divided by the first resistor 25 of the auxiliary sheet feed device 20A and the second resistor 26 of the auxiliary sheet feed device 20B. Subsequently, the divided voltage value is further divided by the first resistor 25 of the auxiliary sheet feed device 20B and the second resistor 26 of the auxiliary sheet feed device 20C. Subsequently, the divided voltage value is further divided in half by the first resistor 25 of the auxiliary sheet feed device 20C and the second resistor 26 of the auxiliary sheet feed device 20D. Thus, the option CPU 33D detects 0.41V which is about one-eighth of 3.3 V as the peak-to-peak of the selection signal (see FIG. 5). Then, the option CPU 33D determines that the auxiliary sheet feed device 20D which is the self-device is in the fourth stage, on the basis of this voltage value.

As described above, each of the option CPUs 33 in the first to fourth stages identifies the mounted position of the auxiliary sheet feed device 20 which is the self-device, on the basis of the divided voltage value of the selection signal.

Subsequently, in the case where it is necessary to select the auxiliary sheet feed device 20 that is to be a communication partner, such as in the case of obtaining data from the ROM 31 of the auxiliary sheet feed device 20, the main body CPU 73 outputs a selection signal having a duty which is different depending on the auxiliary sheet feed device 20 to be selected, from the output port 73*a* via the output connector 6 of the apparatus main body 10 (step S6). For example, the main body CPU 73 outputs four patterns of selection signals having different duties, namely, a first stage selection signal to a fourth stage selection signal shown in FIG. 6 in accordance with the auxiliary sheet feed device 20 to be selected.

Meanwhile, when the selection signal is inputted to the input port 34 via the input connector 27 of each auxiliary sheet feed device 20, each option CPU 33 determines whether the auxiliary sheet feed device 20 which is the self-device has been selected, on the basis of the duty of the selection signal (step S7). For example, when the first stage selection signal shown in FIG. 6 is inputted to the option CPU 33A in the uppermost stage (first stage), the option CPU 33A determines that the auxiliary sheet feed device 20A which is the self-device has been selected. Then, when the option CPU 33A a comes into a state where communication with the main body CPU 73 is enabled, the option CPU 33A changes the potential of the ready signal line from the low level to the high level to notify the main body CPU 73 that the option CPU 33A is in the communication enabled state. Meanwhile, when the main body CPU 73 detects the change in the potential of the ready signal line, the main body CPU 73 recognizes that the option CPU 33A which has been selected as a communication partner is in the communication enabled state, and starts communication therewith. It should be noted that the same applies to the option CPUs 33B, 33C, and 33D. It should be noted that each of the unselected option CPUs 33 causes the ports (including the input port) connected to the ready signal line, the transmission data signal line, and the reception data signal line to come into a high-impedance state.

According to the present embodiment as described above, in a state of being connected to the main body CPU 73 by the one selection signal line SEL, each option CPU 33 identifies in which stage the auxiliary sheet feed device 20 which is the self-device is mounted, whereby it is possible to decrease the number of selection signal lines SEL to reduce the risk of poor contact of the selection signal line SEL, thereby improving the reliability. In addition, according to the present embodiment, in a state of being connected to the main body control portion by the one signal line, each option CPU 33 determines whether the auxiliary sheet feed device 20 which is the self-device has been selected, whereby it is possible to decrease the number of signal lines to reduce the risk of poor contact of the signal line, thereby improving the reliability.

On the other hand, in the conventional art, in the case where four stages of auxiliary sheet feed devices are provided as option devices, since the high-order bit and the low-order bit of a 2-bit value are individually transmitted, two signal lines (selection signal lines) are required which connect the main body control portion to the option control portion of the auxiliary sheet feed device in the uppermost stage or the option control portions of the respective auxiliary sheet feed devices to each other. In addition, in the conventional art, in the case where five or six stages of auxiliary sheet feed devices are provided as option devices, three signal lines are required. As described above, in the conventional art, as the number of the auxiliary sheet feed devices which are option devices increases, the number of the signal lines has to be increased. Thus, the risk of poor contact between the main body control portion or each option control portion and the signal line is increased, which causes a reduction in the reliability.

Although the embodiment of the present disclosure has been described above, the present disclosure is not limited to the above-described embodiment, and, for example, the following modifications are conceivable.

(1) In the above-described embodiment, each option CPU 33 detects the peak-to-peak of the voltage value of the selection signal and identifies the mounted position of the auxiliary sheet feed device 20 which is the self-device, on the basis of this voltage value, but the present disclosure is not limited to this. For example, each option CPU 33 may detect the average of the voltage value of the selection signal and may identify the mounted position of the auxiliary sheet feed device 20 which is the self-device, on the basis of the average of the voltage value.

(2) In the above-described embodiment, since the electric resistance values of the first resistor 25 and the second resistor 26 are the same, the voltage divided value of the selection signal detected in each option CPU 33 is half of the value detected in the immediately upper stage. However, in the case where the electric resistance values of the first resistor 25 and the second resistor 26 are different from each other, the mounted position of the auxiliary sheet feed device 20 may be identified on the basis of a voltage value detected in accordance with the electric resistance values of the first resistor 25 and the second resistor 26.

(3) In the above-described embodiment, the printer A has been described as an example of the image forming apparatus, but the present disclosure is not limited to this and is widely applicable to image forming apparatuses on which option devices are mountable, such as a copy machine and a multifunction peripheral.

(4) In the above-described embodiment, the auxiliary sheet feed devices 20 have been described as examples of the option devices mounted on the image forming apparatus, but it is needless to say that the present disclosure is applicable to an image forming apparatus including other option devices.

(5) In the above-described embodiment, the case has been described in which four stages of the auxiliary sheet feed devices 20 are mounted, but the present disclosure is applicable to any image forming apparatus that includes a plurality of stages of auxiliary sheet feed devices 20, namely, two or more stages of auxiliary sheet feed devices 20.

It is to be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
an apparatus main body configured to form an image on a recording sheet; and
a plurality of stages of option devices mounted on the apparatus main body, wherein
the apparatus main body includes: a main body control processor configured to control an image forming operation; and an output connector connected to the main body control processor via one signal line that connects the main body control processor and each option device of the plurality of stages of option devices,
each option device includes: an option control processor configured to control an operation of its associated option device and including a processor of the one signal line comprising an analog input port, a first resistor connected at one end thereof to the analog input port, a second resistor connected at one end thereof to the analog input port and the one end of the first resistor and connected at another end thereof to ground, an input connector connected to the analog input port and a connection point of the one end of the first resistor and the one end of the second resistor, and an output connector connected to another end of the first resistor,
the output connector of the apparatus main body is connected to the input connector of the option device in a foremost stage,
the output connector of the option device in each stage other than an aftermost stage is connected to the input connector of the option device in a subsequent stage;
the output connector of the option device in the aftermost stage is connected to the ground,
the electric resistance values of the first resistor and the second resistor are the same,
each option device is an auxiliary sheet feed device which auxiliary feeds the recording sheet to the apparatus main body,
the main body control processor, during an initial communication performed immediately after start of power supply, outputs a selection signal via the one signal line, the selection signal being a signal for causing each option device to identify its mounted position, and a peak-to-peak of the selection signal being a predetermined voltage value,
when an option device that is to be a communication partner is being selected, the main body control processor outputs, via the one signal line, the selection signal having a duty that is different depending on a mounted position of the option device to be selected, and
each option control processor identifies in which stage of the plurality of stages of option devices its associated option device is located, on the basis of a peak-to-peak of a voltage value of the selection signal received via the one signal line, and determines whether its associated option device is the selected option device on the basis of the duty of the selection signal.

* * * * *